(12) United States Patent
Kv et al.

(10) Patent No.: US 11,803,978 B2
(45) Date of Patent: *Oct. 31, 2023

(54) GENERATING COMPOSITE IMAGE FROM MULTIPLE IMAGES CAPTURED FOR SUBJECT

(71) Applicant: L&T TECHNOLOGY SERVICES LIMITED, Chennai (IN)

(72) Inventors: Sunil Kv, Honnali (IN); Kasthuri Thiyagarajan, Dharapuram (IN); Arangarajan P, Tiruchengode (IN); Gineesh Sukumaran, Mysore (IN); Karthigeyan S, Salem (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,470

(22) Filed: Mar. 2, 2022

(65) Prior Publication Data

US 2022/0189048 A1 Jun. 16, 2022

Related U.S. Application Data

(63) Continuation of application No. 16/817,081, filed on Mar. 12, 2020, now Pat. No. 11,302,017.

(30) Foreign Application Priority Data

Mar. 12, 2019 (IN) .............................. 201941009522

(51) Int. Cl.
*G06T 7/38* (2017.01)
*G06T 7/571* (2017.01)
(Continued)

(52) U.S. Cl.
CPC .............. *G06T 7/38* (2017.01); *G06T 3/0075* (2013.01); *G06T 5/002* (2013.01); *G06T 5/50* (2013.01);
(Continued)

(58) Field of Classification Search
CPC ......... G06T 7/38; G06T 3/0075; G06T 5/002; G06T 5/50; G06T 7/0002; G06T 7/571
(Continued)

(56) References Cited

U.S. PATENT DOCUMENTS

2006/0045505 A1* 3/2006 Zeineh ................. G02B 21/367
396/89
2009/0263002 A1* 10/2009 Cremer .................... G06T 5/20
382/133

(Continued)

*Primary Examiner* — Jose L Couso (57) ABSTRACT

A method of generating a composite image from multiple images captured for a subject is disclosed. In some embodiments, the method may include receiving, via an image capturing device, a plurality of sets of images of at least a portion of a subject. The images within a set of images may be captured at a plurality of vertical positions with respect to an associated fixed section of a horizontal plane. The method may further include generating a plurality of focus-stacked images corresponding to the plurality of sets of images, for example, by combining the images in the associated set of images. The method may further include aligning the plurality of focus-stacked images in the horizontal plane based on a horizontal coordinate transformation model to generate a composite image representing the subject.

18 Claims, 8 Drawing Sheets

(51) Int. Cl.
*G06T 3/00* (2006.01)
*G06T 5/00* (2006.01)
*G06T 5/50* (2006.01)
*G06T 7/00* (2017.01)

(52) U.S. Cl.
CPC ............ *G06T 7/0002* (2013.01); *G06T 7/571* (2017.01); *G06T 2207/10056* (2013.01); *G06T 2207/10148* (2013.01); *G06T 2207/30168* (2013.01)

(58) Field of Classification Search
CPC . G06T 2207/10056; G06T 2207/10148; G06T 2207/30168; G06T 2200/32; G06T 2207/20221; G06T 3/4038; G06T 5/003; G06T 7/00012; G06T 2207/10028; G06T 2207/20092; G06T 2207/20216; G06T 2207/30004; G06T 2207/30041; G06T 2207/10012; G06T 2207/10004; G06T 2200/21; H04N 4/232125; H04N 4/232133; H04N 4/23229; H04N 4/23232; H04N 4/765; H04N 4/2256; H04N 4/2258; H04N 4/2354; H04N 4/2355; H04N 4/2356; H04N 13/25; H04N 13/133; H04N 13/246; H04N 9/06; G06K 9/209; G06V 10/147; G01B 9/04; A61B 3/14; A61B 3/0058; A61B 1/00; A61B 90/20

See application file for complete search history.

(56) References Cited

U.S. PATENT DOCUMENTS

| | | | |
|---|---|---|---|
| 2010/0284596 A1* | 11/2010 | Miao | G06T 11/005 382/131 |
| 2011/0032337 A1* | 2/2011 | Rodriguez Ramos | G06T 7/571 382/106 |
| 2011/0091125 A1* | 4/2011 | Kenny | G06T 11/00 359/368 |
| 2011/0115896 A1* | 5/2011 | Doehring | H04N 7/183 382/128 |
| 2011/0169985 A1* | 7/2011 | Cooper | G06T 3/4038 348/241 |
| 2014/0064445 A1* | 3/2014 | Adler | G01N 23/083 378/43 |
| 2015/0286044 A1* | 10/2015 | Rout | G02B 21/367 382/163 |
| 2016/0282598 A1* | 9/2016 | Besley | G02B 21/367 |
| 2017/0061601 A1* | 3/2017 | Bryll | G06T 7/0004 |
| 2017/0078532 A1* | 3/2017 | Bryll | H04N 23/74 |
| 2021/0158496 A1* | 5/2021 | Bouchard | G06T 5/50 |

\* cited by examiner

GENERATING COMPOSITE IMAGE FROM MULTIPLE IMAGES CAPTURED FOR SUBJECT

CROSS-REFERENCE TO RELATED APPLICATIONS

The present application is complete specification with respect to Indian provisional specification bearing application number 201941009522, filed on 12 Mar. 2019. Further, the present application is a continuation of U.S. patent application Ser. No. 16/817,081 titled "GENERATING COMPOSITE IMAGE FROM MULTIPLE IMAGES CAPTURED FOR SUBJECT", filed on 22 Mar. 2020. The entirety of the aforementioned applications are incorporated herein by reference for all purposes.

TECHNICAL FIELD

This disclosure relates generally to image processing, and in particular, to generating a composite image from multiple images captured for a subject.

BACKGROUND

Inspection of large and thick specimens (also called subjects) under an optical microscope poses a major challenge. Firstly, due to limited depth of field, it becomes necessary to obtain multiple images from different vertical positions of the subject. Secondly, as in some cases the subject size may be larger than the field of view (FOV) of the microscope, it further becomes necessary to obtain multiple image tiles in a horizontal plane capturing different portions of the subject, in order to cover the entire subject. As such, a number of image processing techniques have to applied for capturing and analyzing the entire subject. For example, one image processing technique, like extended depth of field (EDF), may have to be applied to combine multiple images obtained from multiple vertical positions, so as to generate an all-in-focus image and a depth map. Further, another image processing technique may have to be applied to stich the multiple image tiles capturing portions of the subject, to create a large panoramic view of the subject.

However, these existing image processing techniques (i.e. EDF and stitching) have to be applied independently of each other. This may result in a final image with various defects, for example, missing information between image tiles, scale variations across image tiles, and improper alignment. Further, a significantly high volume of image data needs to be processed which poses challenges in terms of memory and execution speed.

SUMMARY

In one embodiment, a method of generating a composite image from multiple images captured for a subject is disclosed. the method may include receiving, via an image capturing device, a plurality of sets of images of at least a portion of a subject. It may be noted that images within a set of images from the plurality of sets of images may be captured at a plurality of vertical positions with respect to an associated fixed section of a horizontal plane. Further, the associated fixed section of the horizontal plane for each of the plurality of sets of images may be unique. The method may further include generating a plurality of focus-stacked images corresponding to the plurality of sets of images, for example, by combining the images in the associated set of images. The method may further include aligning the plurality of focus-stacked images in the horizontal plane based on a horizontal coordinate transformation model to generate a composite image representing the subject.

In another embodiment, a system for generating a composite image from multiple images captured for a subject is disclosed. The system may include an image capturing device configured to capture a plurality of sets of images of at least a portion of a subject. The image capturing device may be further configured to capture the images within a set of images from the plurality of sets of images at a plurality of vertical positions with respect to an associated fixed section of a horizontal plane. The associated fixed section of the horizontal plane for each of the plurality of sets of images may be unique. The system may further include an image processing device configured to receive the plurality of sets images from the image capturing device, and generate a plurality of focus-stacked images corresponding to the plurality of sets of images, for example, by combining images in the associated set of images. The image processing device may be further configured to align the plurality of focus-stacked images in the horizontal plane based on a horizontal coordinate transformation model to generate a composite image representing the subject.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
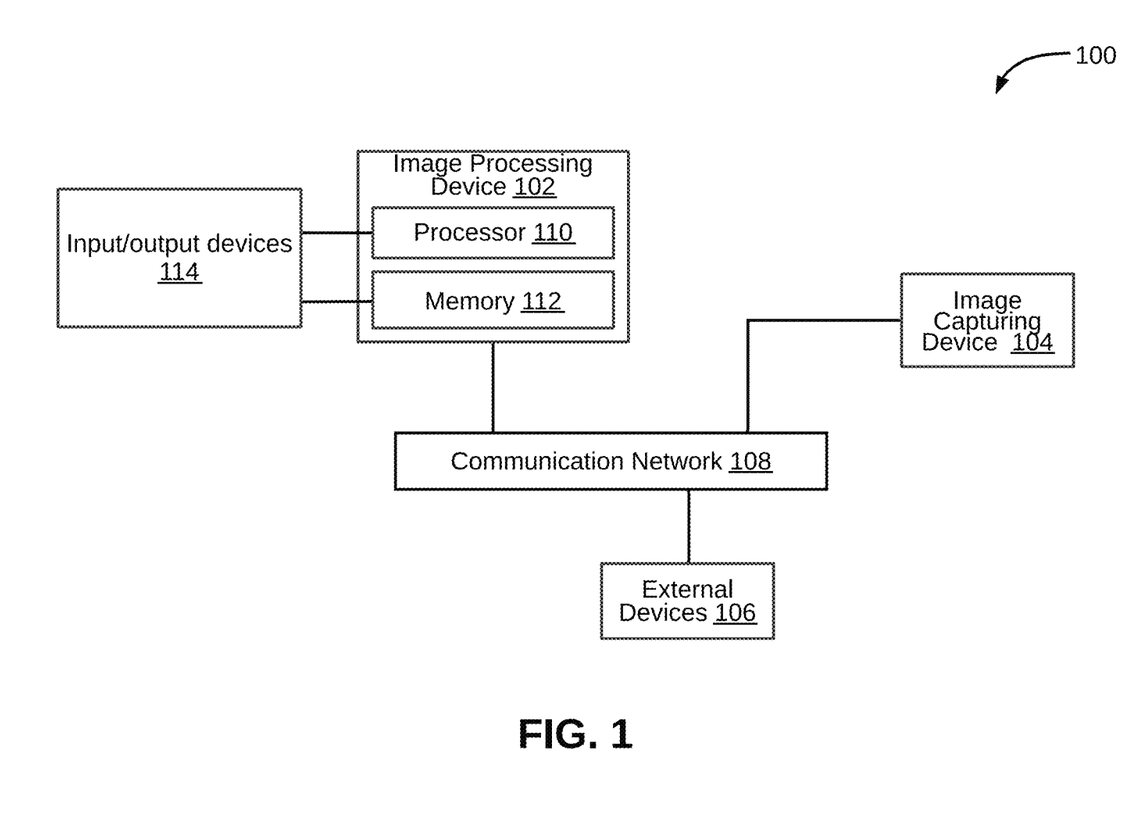
FIG. 1 is a block diagram of a system for generating a composite image from multiple images captured for a subject, in accordance with an embodiment.

Referring to FIG. 1, a block diagram of a system 100 for generating a composite image from multiple images captured for a subject is illustrated, in accordance with an embodiment. The system 100 may include an image processing device 102 for generating a composite image from multiple images captured for a subject. The system 100 may further include an image capturing device 104 and a data storage (not shown in FIG. 1). In some embodiments, the data storage may store multiple images captured for the subject. By way of an example, these multiple images may be captured for the subject by the image capturing device 104. In other words, upon capturing the multiple images of the subject, the image capturing device 104 may store these multiple images in the data storage.

The image processing device 102 may be communicatively coupled to the image capturing device 104 and the data storage via a communication network 108. The communication network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

As will be described in greater detail in conjunction with FIG. 2 to FIG. 9, in order to generate the composite image from the multiple images captured for the subject, the image processing device 102 may receive a plurality of sets of images of at least a portion of the subject captured by the image capturing device. It may be noted that the images within a set of images (from the plurality of sets of images) may be captured at a plurality of vertical positions with respect to an associated fixed section of a horizontal plane. Further, the associated fixed section of the horizontal plane for each of the plurality of sets of images may be unique. The image processing device 102 may further generate a plurality of focus-stacked images corresponding to the plurality of sets of images. It may be further noted that generating the focus-stacked image may include combining the images in the associated set of images. The image processing device 102 may further align the plurality of focus-stacked images in the horizontal plane based on a horizontal coordinate transformation model to generate a composite image representing the subject.

In order to perform the above discussed functionalities, the image processing device 102 may include a processor 110 and a memory 112. The memory 112 may store instructions that, when executed by the processor 110, cause the processor 110 to generate a composite image from multiple images captured for the subject, as discussed in greater detail in FIG. 2 to FIG. 9. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g., image data, horizontal coordinate transformation model data, surface depth map data, calibration parameters data, etc.) that may be captured, processed, and/or required by the system 100.

The image processing device 102 may further include one or more input/output devices 114 through which the image processing device 102 may interact with a user and vice versa. By way of an example, the input/output device 114 may be used to display the composite image to a user. The system 100 may interact with one or more external devices 106 over the communication network 108 for sending or receiving various data. Examples of the one or more external devices 106 may include, but are not limited to a remote server, a digital device, or another computing system.

Figure 2:
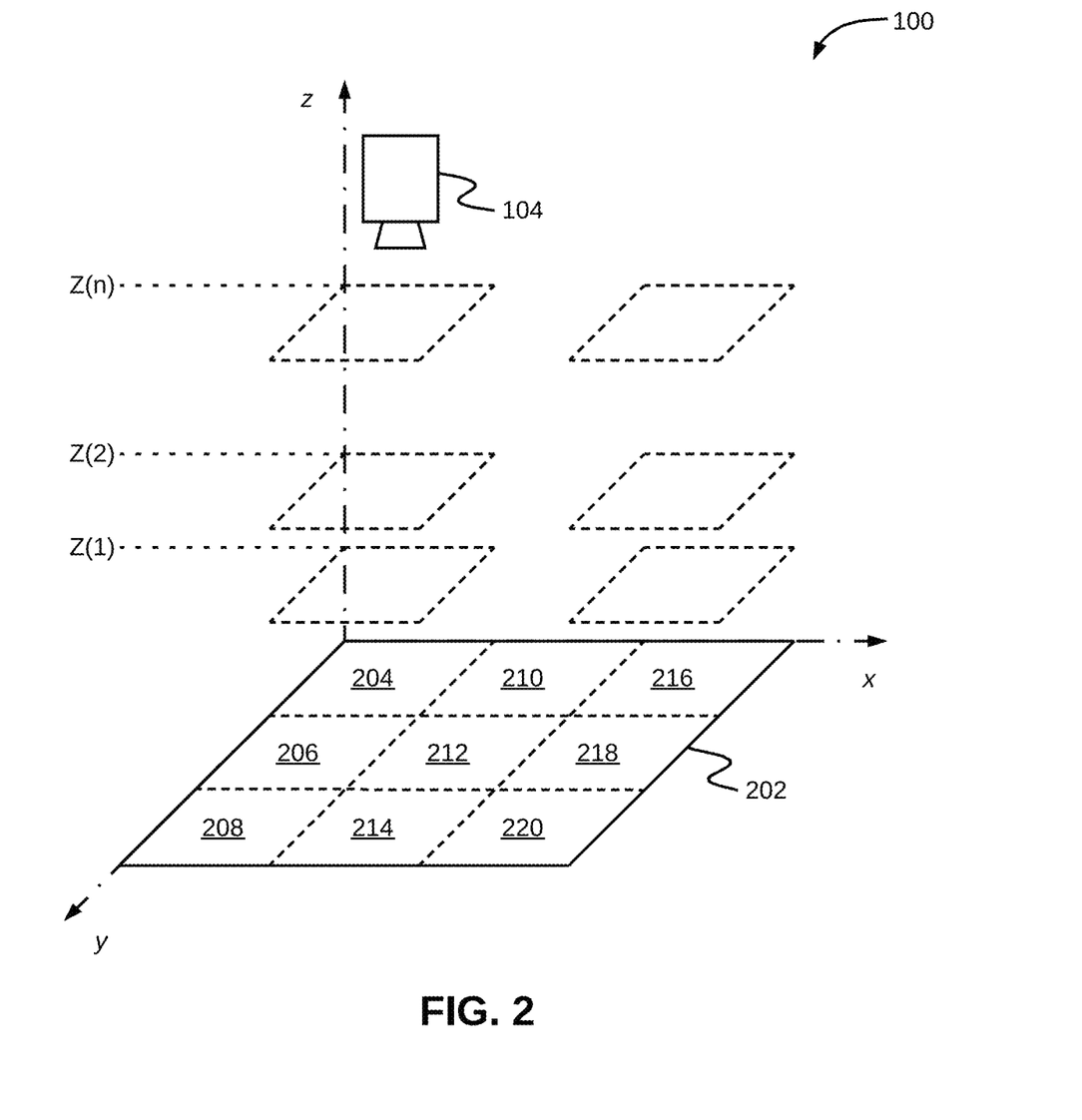
FIG. 2 is a functional block diagram of the system for generating the composite image from multiple images captured for a subject, in accordance with an embodiment.

Referring now to FIG. 2, a functional block diagram of the system 100 for generating a composite image from multiple images captured for a subject is illustrated, in accordance with an embodiment. The system 100 may include an image capturing device 104. By way of an example, the image capturing device 104 may be a camera, for example, a Complementary Metal Oxide Semiconductor (CMOS) camera. In some embodiments, the image capturing device 104 may be an electronic microscope. However, in alternate embodiments, the image capturing device 104 may be fitted to a microscope. In such embodiments, the system 100 may include a stage 202 of the microscope. It may be understood that the multiple images of the subject may be captured upon positioning the subject on the stage 202.

It may be noted that in some cases, the size of the subject may be large, so much so that the entire subject cannot be captured in a field of view (FOV) of the image capturing device 104. Therefore, in order to capture the entire subject, multiple image tiles of different portions of the subject may be captured. It may be desirable to obtain an all-in-focus image of the subject, and it may be further desirable to obtain a depth map of the image, so as to generate a 3D map. Therefore, multiple images may need to be taken from multiple vertical positions.

As such, in some examples, first a set of images of the subject may be obtained such that images within a set of images may be captured at a plurality of vertical positions with respect to an associated fixed section of a horizontal plane. In other words, first, multiple images along a vertical axis (z-axis) may be obtained for a fixed section of a horizontal plane. It may be understood that due to a limited DOF of the image capturing device 104, multiple images along a vertical axis (z-axis) may be obtained to obtain an all-in-focus image. Upon obtaining multiple images along a vertical axis for one fixed section of a horizontal plane, a next fixed section of the horizontal plane may be selected and multiple images may be obtained along a vertical axis corresponding to this next selected fixed section of the horizontal plane. Accordingly, the process may be repeated for all the fixed sections of the horizontal plane. However, in alternate examples, first, a plurality of images may be captured for each of the fixed sections of the horizontal plane, in a single vertical plane, i.e. the vertical position of the image capturing device remains constant with respect to the horizontal plane. Once images of all the fixed sections of the horizontal plane in a vertical plane are captured, then another plurality of images may be captured for each of the fixed sections of the horizontal plane, in a next vertical plane, and the process may be repeated. It may be noted that in some examples, the image capturing device 104 may be fixed and the stage 202 may be movable vertically as well as horizontally. In other words, the stage 202 may move along the z-axis as well and in various x-y planes.

As mentioned earlier, in some cases, size of the subject may be too large to be captured in the FOV of the image capturing device 104. As such, the stage 202 on which the subject is positioned may be divided into a plurality of sub-regions. In other words, a horizontal plane 202 on which the subject is positioned may be divided into a plurality of fixed sections (it may be noted that the terms "stage 202" and "horizontal plane 202" may have been used interchangeably in this disclosure). By way of an example, as shown in FIG. 2, the horizontal plane 202 may be divided into nine fixed sections 204, 206, . . . 220. Accordingly, nine sets of the images may be obtained by the image capturing device 104 corresponding to the nine fixed sections 204, 206, . . . and 220 of the horizontal plane 202. In other words, these associated fixed sections of the horizontal plane 202 for each of the plurality of sets of images may be unique. It may be noted that focal length of the image capturing device 104 may be kept fixed for obtaining images within each of the plurality of sets of images.

It may be noted that the images within each set of images (from the plurality of sets of images) may be captured at a plurality of vertical positions with respect to an associated fixed section of the horizontal plane 202. For example, as shown in FIG. 2, these vertical positions may be $z(1)$, $z(2)$ . . . $z(n)$ along the z-axis. In some embodiments, the position of the image capturing device 104 may be fixed, while the stage 202 of the microscope may be vertically movable. As such, in order to obtain the images within each set of images at a plurality of vertical positions with respect to an associated fixed section of the horizontal plane 202, the horizontal plane 202 (i.e. the stage 202 of the microscope) may be vertically moved.

However, in alternate embodiments, the position of the horizontal plane 202 (i.e. the stage 202 of the microscope) may be fixed, and the image capturing device 104 may be vertically movable with respect to the horizontal plane 202. As such, in order to obtain the images within each set of images, the image capturing device 104 may be vertically moved.

For example, images within a first set corresponding to the section 204 may be obtained at vertical positions $z(1)$, $z(2)$, . . . $z(n)$ of the horizontal plane 202 with respect to the image capturing device 104. Similarly, images within a seventh set corresponding to the section 216 may be obtained at vertical positions $z(1)$, $z(2)$, . . . $z(n)$ of the horizontal plane 202 with respect to the image capturing device 104. It may be understood that in order to obtain images within another set corresponding to another section (from the sections 206-220), one of the image capturing device 104 and the horizontal plane 202 may be moved in a horizontal (x-y) plane. This movement in the horizontal (x-y) plane may also be termed as horizontal translation. Accordingly, in the similar way as described above, images within each of the nine sets may be obtained.

Once the plurality of sets of images are obtained by the image capturing device 104, these plurality of sets of images may be received by the image processing device 102 (not shown in FIG. 2). It may be noted that, in some embodiments, the image capturing device 104 may implement the image processing device 102. The image processing device 102 may generate a plurality of focus-stacked images corresponding to each the plurality of sets of images. It may be noted that generating a focus-stacked image (from the plurality of focus-stacked images) may include combining the images in the associated set of images. For example, the images within the first set corresponding to the section 204 may combined to generate a first focus-stacked image.

Similarly, the images within the rest of the sets corresponding to each of the sections 206-220 may be combined to generate the plurality of focus-stacked images.

As it will be appreciated by those skilled in the art, for generating a focus-stacked image, the images in each of the plurality of sets may be aligned correctly with respect to each other to account for translation and scale variations. As such, generating a focus-stacked image (from the plurality of focus-stacked images) may include performing a translation and scale correction for the images in the associated set of images. In some embodiments, the translation and scale correction for the images may be performed using one or more calibration parameters of the microscope.

By way of an example, performing the translation and scale correction may include selecting an image from the images in a set of images as a reference image. Upon selecting the reference image, an affine transformation may be applied between the selected reference image and each of the remaining images in the associated set of images. The affine transformation may be performed using the one or more calibration parameters of the microscope, so as to generate a set of translation and scale corrected images. In some embodiments, the one or more calibration parameters of the microscope may include a focal length of an objective lens of the microscope, or an angular aperture of the objective lens, or a function of a stage position of the microscope.

As it will be further appreciated, for a constant magnification and angular aperture of the objective lens, and no rotation of image capturing device 104 and the stage 202, the scale and translation component may follow almost a linear relationship with vertical position, (i.e. z stage position). Further, translation between different fixed sections of the horizontal plane 202 may have a linear relationship with their corresponding positions in the horizontal plane 202 (i.e. positions in the x-y plane of the stage 202).

In some embodiments, performing translation and scale correction may include applying a vertical coordinate transformation model (T). To this end, a one-time calibration procedure may be performed to derive coordinate transformations. As it will be appreciated, the coordinate transformations may include introducing known transformations in space, such as checker board. Further, coordinate transformation coefficients may be derived which may govern transformation as a function of stage positions in z plane. By way of an example, a transformation between different horizontal planes (i.e. different x-y planes along different vertical positions) may be calculated by the vertical coordinate transformation model (T). This vertical coordinate transformation model (T) may be a function of calibration parameters of focal length of an objective (f), angular aperture of the objective ($\Theta$), and a stage position of the microscope. By way of an example, the vertical coordinate transformation model (T) may be as given below:

$$T=F(f,\Theta,z)$$

The vertical coordinate transformation model (T) may be derived from the microscope hardware and optics parameters.

In some embodiments, upon generating the plurality of focus-stacked images, the image processing device 102 may align the plurality of focus-stacked images in the horizontal plane 202, based on a horizontal coordinate transformation model to generate a composite image representing the entire subject, by stitching the plurality of focus-stacked images.

In some embodiments, in order to stitch the plurality of focus-stacked images, a position correction may be performed on the plurality of focus-stacked images. It may be noted that in order to perform the position correction, the image processing device 102 may receive an initial X offset and an initial Y offset between a pair of adjacent focus-stacked images from the image capturing device 104, based on user input overlap percentage. However, the initial X offset and the initial Y offset values may not be accurate, due to one or more errors like errors associated with the stage 202 and errors associated with view point variations due to non-tele centric lenses. To this end, upon determining, initial X offset and an initial Y offset, the image processing device 102 may further refine the initial X offset and the initial Y offset. By way of an example, refining the initial X offset and the initial Y offset may include identifying an overlapped region between the pair of adjacent focus-stacked images upon aligning the plurality of focus-stacked images, using the horizontal coordinate transformation model, based on the one or more calibration parameters like stage position and reference image.

In some embodiments, stitching together the plurality of focus-stacked images may further include blending the overlapped region with non-overlapped region of the pair of adjacent focus-stacked images (from the plurality of focus-stacked images). For example, the blending may be one of an alpha blending and a pyramidal blending.

In some embodiments, the image processing device 102 may further generate a plurality of surface depth maps corresponding to the plurality of sets of images. It may be noted that generating a surface depth map (from the plurality of surface depth maps) may be based on combining the images in the associated set of images. It may be further noted that a three-dimensional (3-D) panorama reconstruction may be later generated from the plurality of surface depth maps, using any conventional technique.

Figure 3:
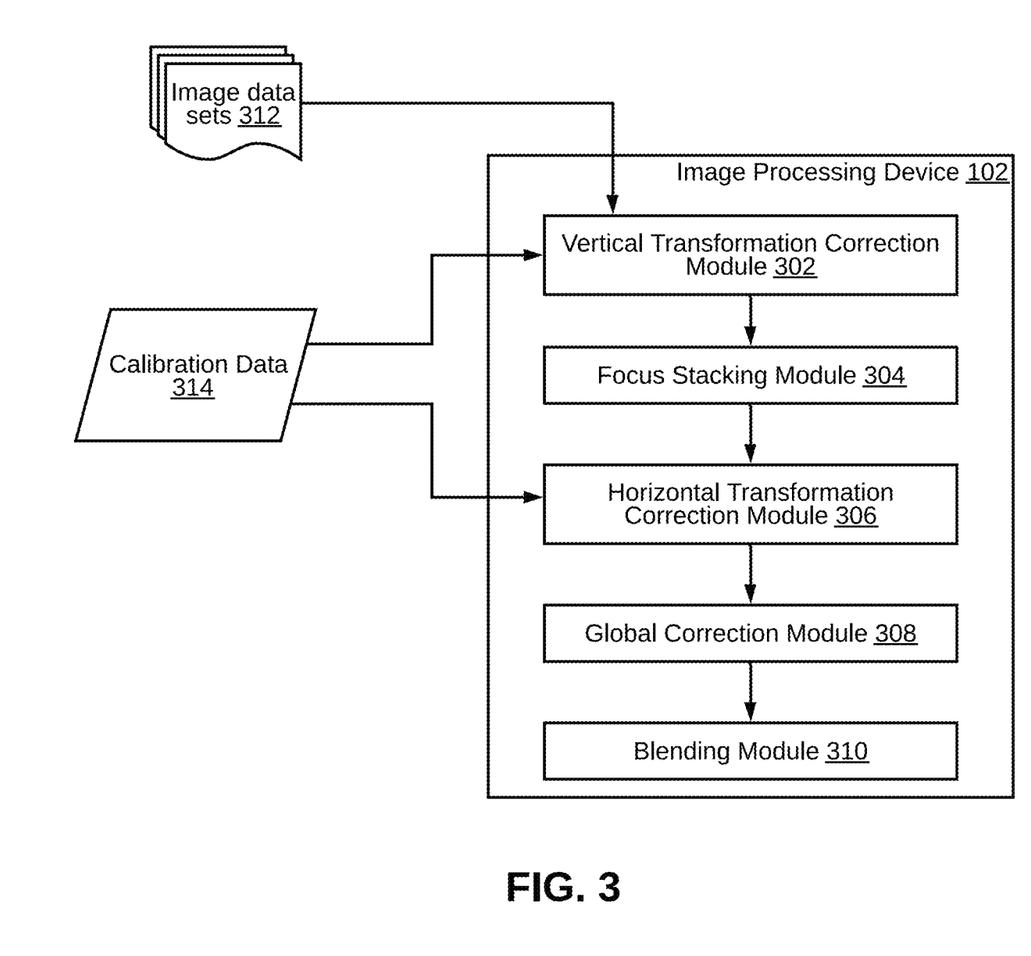
FIG. 3 is a functional block diagram of an image processing device, in accordance with an embodiment.

Referring now to FIG. 3, a functional block diagram of the image processing device 102 is illustrated in accordance with an embodiment. The image processing device 102 may include a vertical transformation correction module 302, a focus-stacking module 304, a horizontal transformation correction module 306, a global correction module 308, and a blending module 310.

In some embodiments, the vertical transformation correction module 302 may receive image data sets 312. For example, the image data sets 312 may include the plurality of sets of images captured by the image capturing device 104. As mentioned earlier, one image from each set of images may be selected as a reference image. Further, one or more calibration parameters may be used to derive an affine transformation between a reference image and an image that needs to be corrected. The vertical transformation correction module 302 may therefore receive calibration data 314. As such, the vertical transformation correction module 302 may generate a plurality of sets of translation and scale corrected images.

The focus stacking module 304 may receive the plurality of sets of translation and scale corrected images from the vertical transformation correction module 302. In some embodiments, the focus stacking module 304 may apply focus fusion technique to the plurality of sets of translation and scale corrected images, so as to generate the plurality of focus-stacked images. In other words, the focus stacking module 304 may receive a set of translation and scale corrected images and generate an all-in-one focus image corresponding to that set of translation and scale corrected images. It may be noted that for focus stacking, any conventional techniques of extending depth of focus (EDF) may be applied, as discussed in detail in conjunction with FIG. 9.

Further, in some embodiment, an energy value may be computed for each pixel, and may be compared against corresponding pixel locations in each set of images during vertical focus stacking.

The horizontal transformation correction module 306 may receive the plurality of focus-stacked images from the focus stacking module 304. The horizontal transformation correction module 306 may align the plurality of focus-stacked images based on a horizontal coordinate transformation model. The horizontal transformation correction module 306 may further stitch the plurality of focus-stacked images to render a seamless composite image.

It may be noted that the plurality of focus-stacked images may need to be corrected for horizontal translation (in the (x-y) plane). To this end, the horizontal transformation correction module 306 may receive an initial X offset value and an initial Y offset value between a pair of adjacent focus-stacked images from the image capturing device, based on user input overlap percentage.

It may be noted that the initial X offset and the initial Y offset values may not be accurate, due to one or more errors. For example, the one or more errors may include errors associated with the stage 202, and errors associated with view point variations due to non-tele centric lenses. To this end, upon determining, the horizontal transformation correction module 306 may further refine the initial X offset and the initial Y offset. In some embodiments, the horizontal transformation correction module 306 may further refine the initial X offset and the initial Y offset. It may be noted that the refining may include identifying an overlapped region between the pair of adjacent focus-stacked images using the horizontal coordinate transformation model, based on the one or more calibration parameters. The horizontal transformation correction module 306 may receive the one or more calibration parameters in form of calibration data 314.

The global correction module 308 may receive input images which may be the plurality of horizontal transformation corrected focus-stacked images from the horizontal transformation correction module 306, and may apply color correction to remove any color-inconsistences. For example, the global correction module 308 may normalize the illumination across the plurality of input images. By way of an example, the global correction module 308 may compute a reference value from a selected image and further apply an appropriate correction transformation to all other images.

The blending module 310 may receive the color corrected images from the global correction module 308 and may blend the overlap regions using conventional blending techniques, such as, but not limited to, alpha blending and pyramidal blending. The blending module 310 may further apply a similar procedure for the individual depth maps to create a panoramic 3D surface.

Horizontal Coordinate Transformation Model

Figure 4:
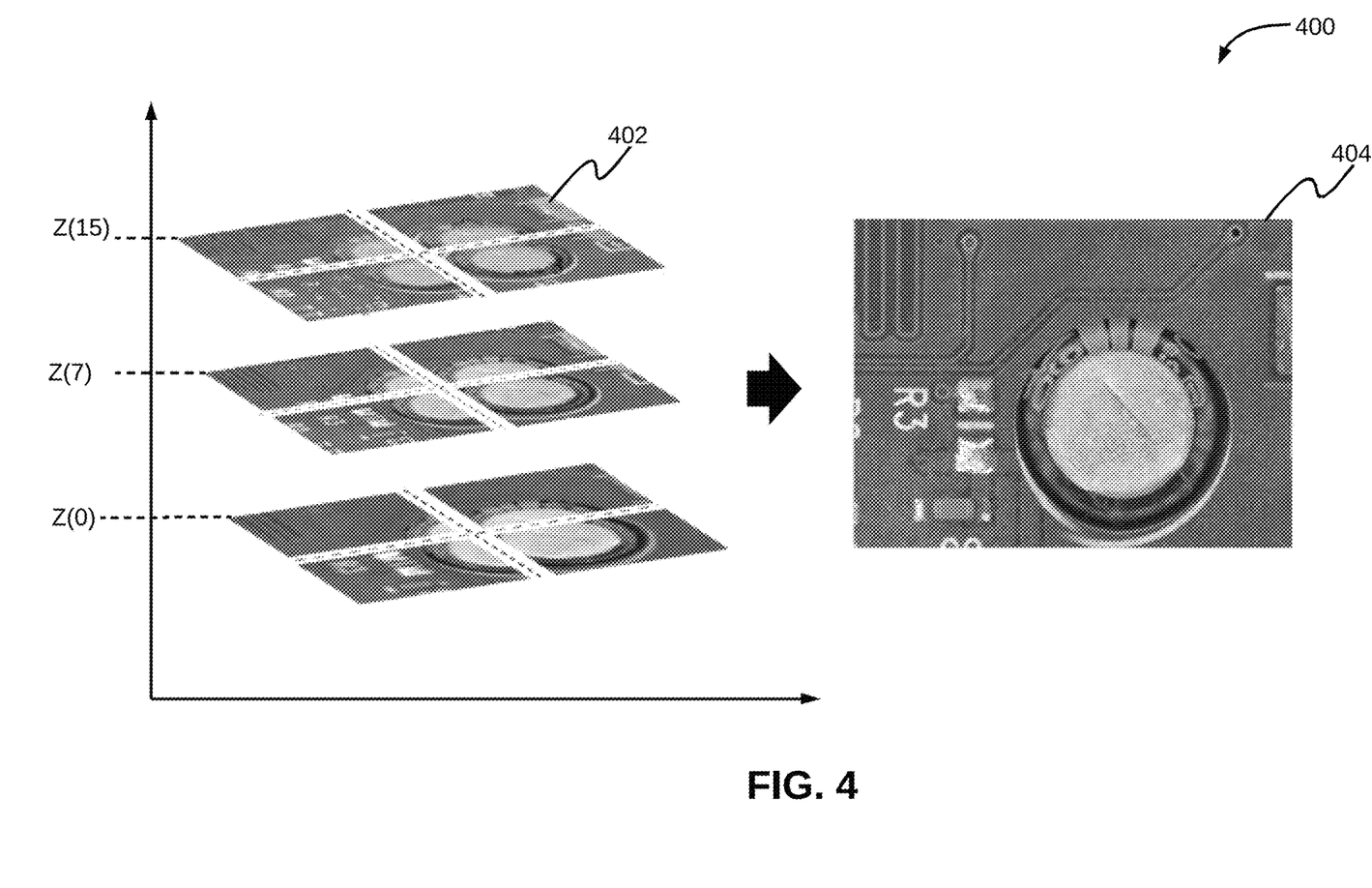
FIG. 4 illustrates a calibration process with image tiles having an overlap between adjacent image tiles, in accordance with an embodiment.

It may be noted that the horizontal coordinate transformation model may be derived to find the correct overlap percentage to stitch composite images accurately. As it will be appreciated, in order perform stitching between adjacent images, some common region (e.g. a set of pixels) between adjacent images—which can be specified by the user during image acquisition—may be identified. An overlap percentage ($O_{set}$) may be provided as input to the microscope, so that the stage movement may be set accordingly. To this end, a calibration process may be performed with image tiles to derive the horizontal coordinate transformation model, based on which images may be stitched to generate a composite image. By way of an example, a calibration process 400 with image tiles 402 having an overlap between adjacent image tiles is illustrated in FIG. 4. As shown in FIG. 4, multiple image tiles 402 may be obtained from different vertical positions along z axis, for example, z(1), z(7), and z(15). For example, as shown in FIG. 4, four image tiles may be obtained from each of different vertical positions like z(1), z(7), and z(15). It may be noted that during the calibration process, these image tiles may be stitched (for example, as shown, the multiple image tiles 402 may be stitched into a single image tile 404.) to derive the horizontal coordinate transformation model, which can be later used to stitch a plurality of focus-stacked images to generate a composite image.

It may be noted that the stitching may yield inaccurate results, because of the non-telecentric property of the lens. It may be further noted that the FOV of the non-telecentric lens varies linearly with the vertical distance of the image capturing device 104 with respect to the horizontal plane 202. For example, as the vertical distance of the image capturing device 104 increases with respect to the horizontal plane 202, the FOV increases in a linear relationship with this vertical distance. As such, the overlap (i.e. common region) between the adjacent images in a horizontal plane also varies accordingly. Further, it is observed that the overlap between adjacent images also varies linearly with the vertical distance and an input overlap percentage ($O_{set}$). Therefore, for a given input overlap percentage ($O_{in1}$), optimal overlap ($O_1$, $O_2$, $O_3$, ...) between adjacent image tiles for different vertical positions (for example, z(1), z(2), z(3)) may be calculated using constrained optimization techniques like gradient descent and expectation-maximization (EM) algorithm. Similarly, the optimal overlap ($O_1$, $O_2$, $O_3$, ...) may be calculated for other input overlap percentage ($O_{in2}$, $O_{in3}$, ...) as well.

In some embodiments, a computed optimal overlap percentage ($O_1$, $O_2$, $O_3$, ...) between two image tiles for different vertical positions for a particular overlap percentage ($O_{in1}$) may be derived using a linear equation, as given below:

$$Y = M \cdot Z + C \qquad (1)$$

where,
Y=computed overlap percentage between two image tiles
M=slope value obtained from different input overlaps ($m_1$, $m_2$, $m_3$ ...)
C=intercept value obtained from different input overlaps ($c_1$, $c_2$, $c_3$ ...)
Z=vertical position of the stage.

It may be noted that the slope values ($m_1$, $m_2$, $m_3$ ...) and intercept values ($c_1$, $c_2$, $c_3$ ...) of the Equation (1) may vary linearly with respect to the input overlap set by the user $O_{set}$. Further, factors $m_{slope}$ and $c_{slope}$ may be derived using ($m_1$, $m_2$, $m_3$ ...), and factors $m_{intercept}$ and $c_{intercept}$ may be derived using ($c_1$, $c_2$, $c_3$, ...). A linear model is derived to compute the slope and intercept as given below in Equation (2) and Equation (3), respectively for any input overlap percentage ($O_{set}$) set by the user, using a horizontal coordinate transformation model, as given below.

$$\text{Computed\_}m = m_{slope} * O_{set} + c_{slope} \qquad (2)$$

$$\text{Computed\_}c = m_{intercept} * O_{set} + c_{intercept} \qquad (3)$$

where,
$m_{slope}$ and $m_{intercept}$=slope with respect to user set input overlap percentage
$O_{set}$=user set overlap percentage
$c_{slope}$ and $c_{intercept}$=Intercept with respect user set input overlap percentage.

A final overlap percentage may be calculated using Equation (4), as given below:

$$\text{Final}_{Overlap} = \text{Computed\_}m * z\_pos + \text{Computed\_}c \qquad (4)$$

where,
$\text{Final}_{Overlap}$=Computed overlap percentage between two image tiles at a vertical position
Computed_m=Slope
Computed_c=Intercept
z_pos=vertical position of the stage.

The above calculated $\text{Final}_{Overlap}$ may be verified and validated by capturing images with different magnifications, for example, 40× and 160×. The Images captured with 160× magnification may be stitched using the overlap obtained from the horizontal coordinate transformation model and validated using algorithms like Structural Similarity Index (SSIM), Cross Correlation etc. to verify that the horizontal coordinate transformation model has given accurate overlap percentage for stitching. The horizontal coordinate transformation model may perform stitching accurately for planar objects. In order to stitch specimen with complex surface topology, depth offset needs to be calculated. This problem may be addressed by finding the depth offset by calculating the stage vertical position where the background and foreground of the object is focused. It may be understood that usually background is the surface of the stage (reference vertical position at which planar object on the stage is focused). The depth offset is further explained in detail in conjunction with FIG. 5.

Figure 5:
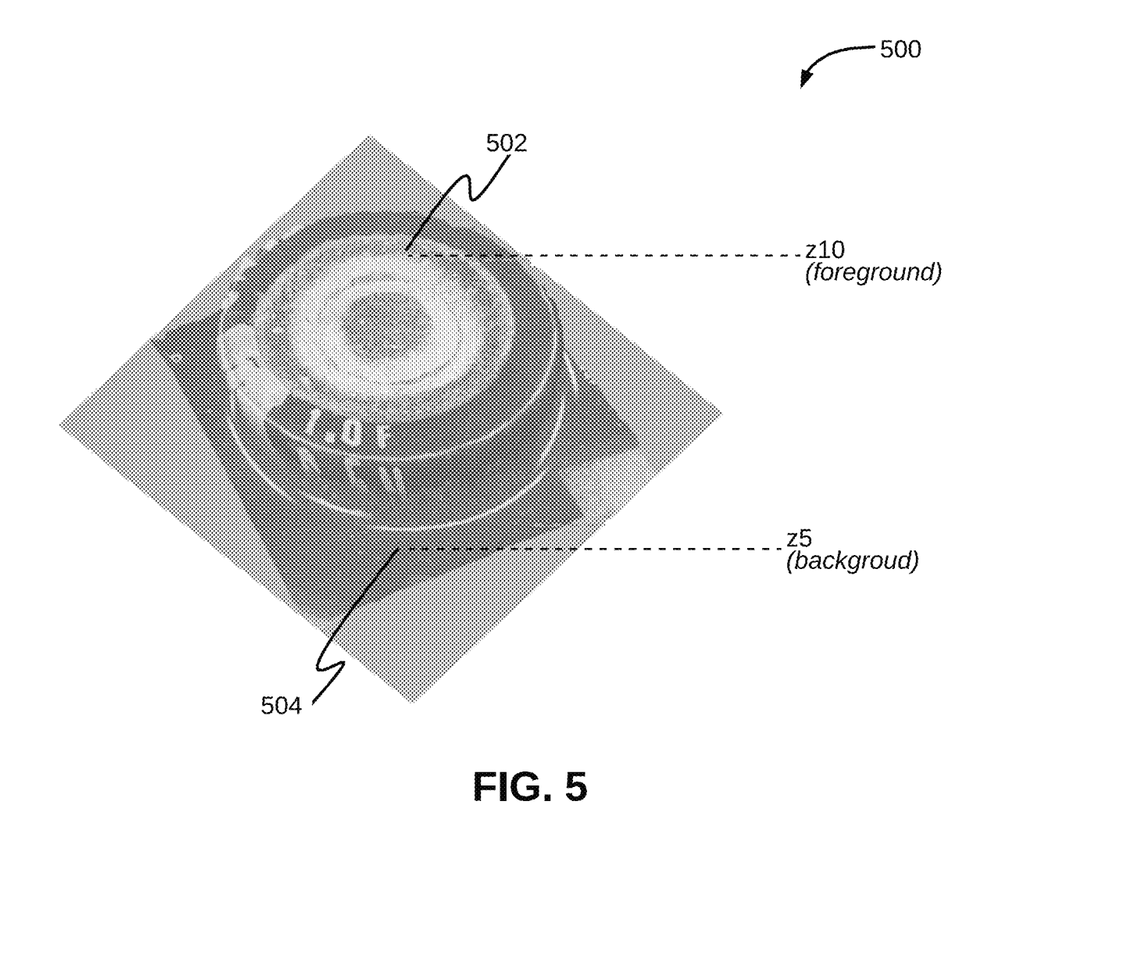
FIG. 5 illustrates a perspective view of a subject having a first portion and a second portion, in accordance with another embodiment of the present disclosure.

Referring now to FIG. 5, a perspective view of a subject 500 having a first portion 502 and a second portion 504 is illustrated in accordance with an embodiment. The first portion 502 and the second portion 504 may be captured in different images obtained from different vertical positions, for example, z(5) focusing on the background and z(10) focusing on the foreground, and having different DOFs. As such, the depth offset with respect to the two images may be difference in the respective DOFs. The depth offset for foreground may be calculated by finding the absolute difference between these stage vertical positions, using Equation (5) as given below:

$$z^1 = z + \text{abs}(z_{background} - z_{foreground}) \qquad (5)$$

where,
z=stage position of the final composed image
$z_{background}$=stage position where background is in focus
$z_{foreground}$=stage position where foreground is in focus A final overlap percentage may be calculated using a new $z^1$ position instead of stage position z at which foreground is focused, using Equation (6), as given below:

$$\text{Final Overlap percentage} = \text{Computed\_}m * z^1 + \text{Computed\_}c \qquad (6)$$

Figure 6:
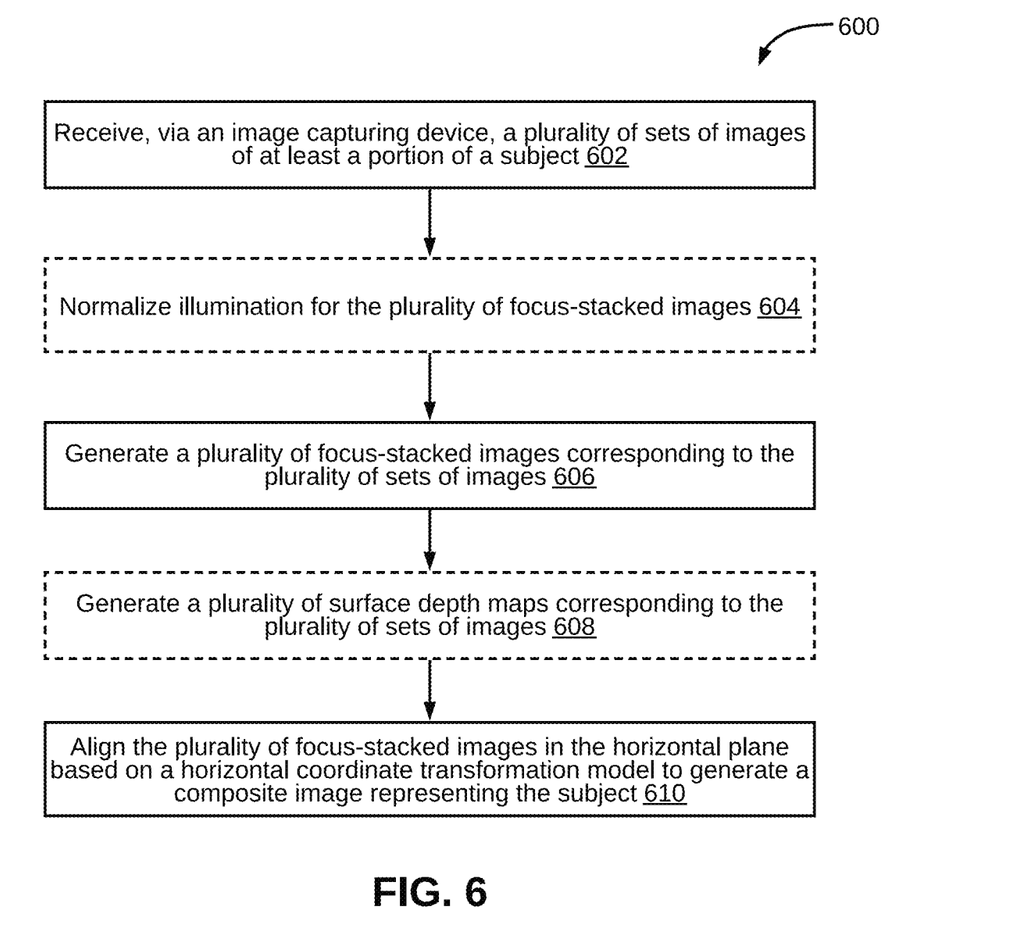
FIG. 6 is a flowchart of a method of generating a composite image from multiple images captured for a subject, in accordance with another embodiment of the present disclosure.

Referring now to FIG. 6, a flowchart of a method 600 of a method of generating a composite image from multiple images captured for a subject is illustrated, in accordance with an embodiment of the present disclosure. In some embodiments, at step 602, a plurality of sets of images of at least a portion of a subject may be received. It may be noted that these plurality of sets of images may be received from the image capturing device 104, which may be CMOS camera. It may be further noted that images within a set of images may be captured at a plurality of vertical positions with respect to an associated fixed section of the horizontal plane 202. Further, the associated fixed section of the horizontal plane 202 for each of the plurality of sets of images may be unique.

At step 604, illumination correction may be performed on the images within the set of images. At step 606, a plurality of focus-stacked images may be generated corresponding to the plurality of sets of images. A focus-stacked image may be generated by combining the images in an associated set of images. In some embodiments, generating a focus-stacked image may include performing translation and scale correction for images in the associated set of images using one or more calibration parameters of a microscope. This is further explained in detail in conjunction with FIG. 7.

Figure 7:
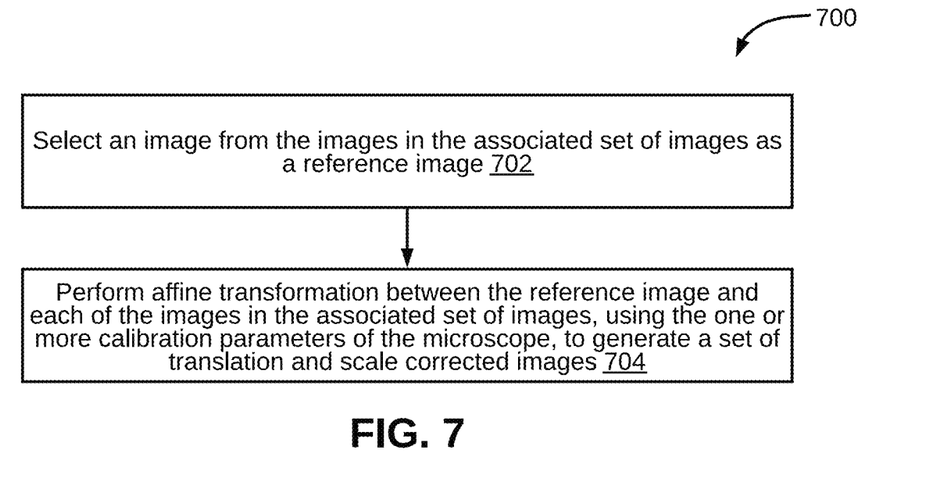
FIG. 7 is a flowchart of a method of performing translation and scale correction for images, in accordance with an embodiment of the present disclosure.

Referring now to FIG. 7, a flowchart of a method 700 of performing translation and scale correction for images is illustrated, in accordance with an embodiment of the present disclosure. In some embodiments, at step 702, an image may be selected as a reference image from the images in the associated set of images. At step 704, affine transformation may be performed between the reference image and each of the images in the associated set of images, using the one or more calibration parameters of the microscope, to generate a set of translation and scale corrected images. It may be noted that the one or more calibration parameters of the microscope may include a focal length of an objective lens of the microscope, an angular aperture of the objective lens, or a function of a stage position of the microscope.

Returning back to FIG. 6, in some embodiments, at step 608 a plurality of surface depth maps may be generated corresponding to the plurality of sets of images. It may be noted that generating a surface depth map may be based on combining the images in the associated set of images. At step 610, the plurality of focus-stacked images may be aligned in the horizontal plane based on a horizontal coordinate transformation model to generate a composite image representing the subject. In some embodiments, generating the composite image may include stitching together the plurality of focus-stacked images and performing position correction on the plurality of focus-stacked images. This is further explained in conjunction with FIG. 8.

Figure 8:
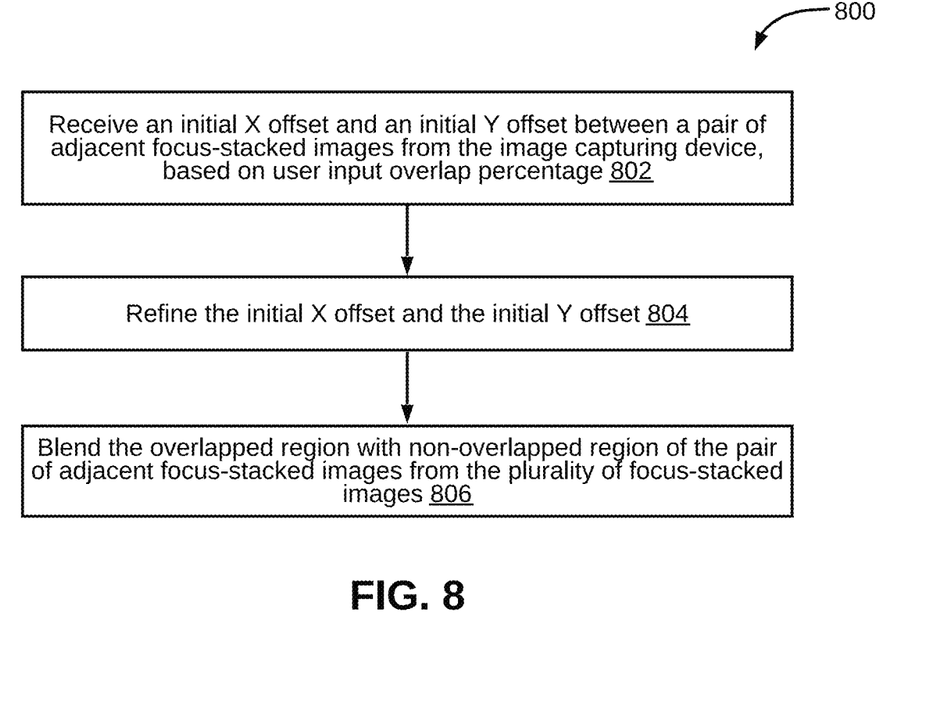
FIG. 8 is a flowchart of a method of performing position correction on a plurality of focus-stacked images, in accordance with an embodiment of the present disclosure.

Referring now to FIG. 8, a flowchart of a method 800 of performing position correction on the plurality of focus-stacked images is illustrated, in accordance with an embodiment of the present disclosure. In some embodiments, at step 802, an initial X offset and an initial Y offset between a pair of adjacent focus-stacked images may be received from the image capturing device 104, based on user input overlap percentage. At step 804, the initial X offset and the initial Y offset may be refined. In some embodiments, the refining may include identifying an overlapped region between the pair of adjacent focus-stacked images upon aligning the plurality of focus-stacked images, using the horizontal coordinate transformation model, based on the one or more calibration parameters. At step 806, the overlapped region may be blended with non-overlapped region of the pair of adjacent focus-stacked images from the plurality of focus-stacked images. The blending may be alpha blending or a pyramidal blending.

Figure 9:
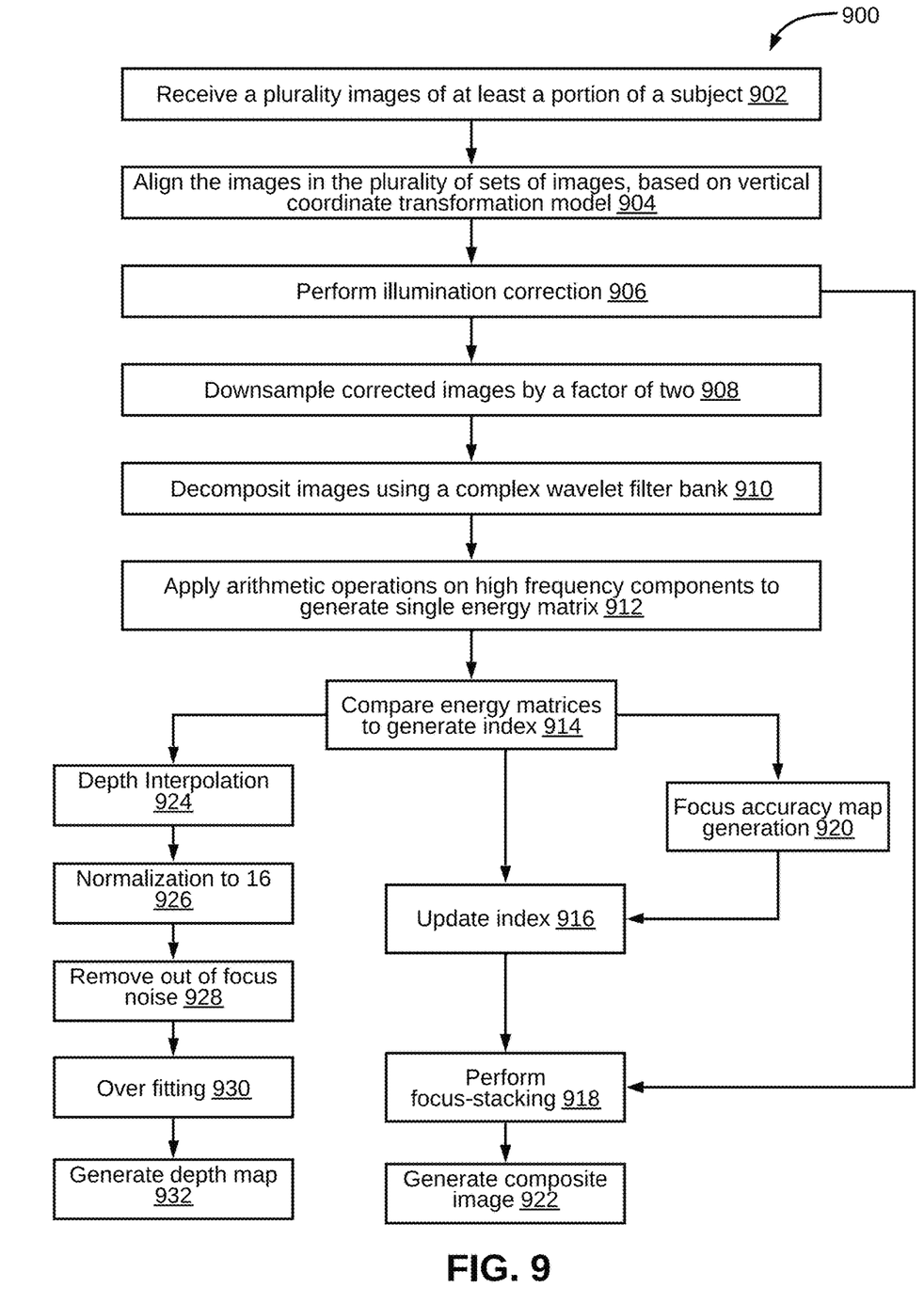
FIG. 9 is a flowchart of a process overview of generating a composite image from multiple images captured for a subject, in accordance with an embodiment.

Referring now to FIG. 9, a flowchart of a process overview 900 of generating a composite image from multiple images captured for a subject is illustrated, in accordance with an embodiment of the present disclosure. In some embodiments, at step 902, a plurality of images of at least a portion of a subject may be received. At step 904, the plurality of images may be aligned based on the vertical coordinate transformation model. At step 906, illumination correction may be performed on the images to generate corrected images. At step 908, the corrected images may be down sampled by a factor of two. It may be noted that in some embodiments, complex wavelet decomposition may be used for energy content calculations. In such embodiments, first, each color image in a stack may be converted to gray scale, and reduced to a lower resolution. Then, wavelet decomposition may be performed using a complex wavelet filter bank. An absolute sum of the detail coefficients in each image may be chosen as the focus measure. For example, a raw index map may be generated by picking index of the stack with highest focus measure for a particular pixel, across the stack. As such, at step, 910, the images may be de-composited using a complex wavelet filter bank. At step 912, arithmetic operations may be applied on high frequency components to generate single energy matrix.

It may be noted that images may be processed at a lower resolution (typically in powers of 2) to create an index map. This lower resolution index map may then be interpolated back to original resolution via suitable interpolation scheme (currently bi-linear). This may result in sufficient quality for reconstructing the composite image and further may reduce processing time. Moreover, processing at lower resolution may help in reducing the impulse noises present in the images. At step 914, energy matrices may be compared to generate index. In some embodiments, at step 916, the index may be updated, and at step 918, focus stacking may be performed. At step 922, a composite image may be generated from the focus-stacked images. Further, in some embodiments, after step 914, at step 920, a focus energy may be generated, and the method 900 may once again proceed to step 916.

Further, in some embodiments, after step 914, at step 924, depth interpolation may be performed. At step 926, images may be normalized to a factor of 16. it may be noted that focus accuracy may be measured by comparing focus measure behavior at a particular pixel against a reference signal model. Here, the reference signal may be a Gaussian curve. Considering the focus measure values at any pixel across the stack is a one-dimensional signal, a peak of the signal may be identified and local minima may be determined on both sides of the peak. At step 930, over fitting may be analyzed. A Gaussian fitting may be performed to obtain a Gaussian curve. Further, a mean square difference of the estimated curve may be determined with respect to original complex coefficient curve, and divided by square of the maximum value for normalization. This may give a single value for each pixel, the inverse of which is a representation of accuracy with which focus selection is done. Focus measure values in the regions where the object is focused may follow Gaussian nature while other parts having extensive smoothness in texture may follow random nature. The pixels corresponding to focused part yield low Gauss-fit values whereas smooth pixels yield high values. It may be further noted that the index map may contain noise (i.e. random index) wherever the scene is out of focus. This noise needs to be removed and the index map needs to be further processed to obtain a refined index. Therefore, at step 928, out of focus noises may be removed. By way of an example, noise removal may be performed by masking index map with focus accuracy map, expanding the masked index map, blurring the result by a smoothing filter, and overlapping masked index map on blurred output. Further, out of focus regions may have low frequency content in the focus accuracy map. As such, in some embodiments, a suitable threshold may be applied on the focus accuracy map to identify these regions. In the composite image, it may be desirable to pick these out of focus regions from the last image of the stack to avoid blotchiness. To this end, the current index values in these regions may be changed to maximum index (index of the last image), and the in-focus region in the index map may be then expanded and blurred in order to get a smooth transition between the object index values and the highest index value of the out of focus region. Finally, a masked index map may be placed on top of this processed image to obtain the refined index map. Furthermore, smoothing may be performed to remove impulse noises. At step 932, surface depth map may be generated.

Technical Advantages

The specification has described various techniques for generating a composite image from multiple images captured for a subject. The above disclosed techniques provide for applying various image processing techniques, like EDF and stitching in a homogeneous manner, i.e. without need of applying them independently. As such, the techniques provide for obtaining accurate results while minimizing defects like missing information between image tiles, scale variations across image tiles, and improper alignment. Further, the techniques provide for processing high volume of image data using low memory and low execution speed, thereby expediting the image processing process, and making the process time efficient and cost efficient.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating a composite image, the method comprising:
    receiving a plurality of sets of images of at least a portion of a subject, wherein images within a set of images from the plurality of sets of images are obtained at a plurality of vertical positions of an image capturing device relative to an associated fixed section of a horizontal plane, and wherein the associated fixed section of the horizontal plane for each of the plurality of sets of images is unique;
    combining the images associated with each of the plurality of sets of images and performing translation and scale correction for the images applying vertical coordinate transformation model using the one or more calibration parameters of a microscope to generate a plurality of focus-stacked images corresponding to the plurality of sets of images, wherein the one or more calibration parameters of the microscope comprise: one or more of a focal length of an objective lens of the microscope, an angular aperture of the objective lens, and a function of a stage position of the microscope;
    aligning the plurality of focus-stacked images in the horizontal plane; and
    upon aligning, performing position correction on the plurality of focus-stacked images to generate a composite image representing the subject, wherein performing the position correction comprises;
    receiving an initial X offset and an initial Y offset between a pair of adjacent focus-stacked images from the image capturing device, based on user input overlap percentage; and
    refining the initial X offset and the initial Y offset by identifying an overlapped region between the pair of adjacent focus-stacked images upon aligning the plurality of focus-stacked images using a horizontal coordinate transformation model, based on one or more calibration parameters.

2. The method of claim 1 further comprising:
    generating a plurality of surface depth maps corresponding to the plurality of sets of images, wherein generating a surface depth map is based on combining the images in the associated set of images.

3. The method of claim 1, wherein the image capturing device is a Complementary Metal Oxide Semiconductor (CMOS) camera.

4. The method of claim 1, wherein performing the translation and scale correction comprises:
    selecting an image from the images in the associated set of images as a reference image; and
    performing affine transformation between the reference image and each of the images in the associated set of images, using the one or more calibration parameters of the microscope, to generate a set of translation and scale corrected images.

5. The method of claim 1 further comprising normalizing illumination for the plurality of focus-stacked images.

6. The method of claim 1, wherein generating the composite image further comprises blending the overlapped region with non-overlapped region of the pair of adjacent focus-stacked images from the plurality of focus-stacked images, wherein the blending is one of an alpha blending and a pyramidal blending.

7. A system for generating a composite image, the system comprising:
    an image capturing device configured to capture a plurality of sets of images of at least a portion of a subject; and
    an image processing device configured to:
        receive the plurality of sets images from the image capturing device;
        combine the images associated with each of the plurality of sets of images and performing translation and scale correction for the images applying vertical coordinate transformation model using the one or more calibration parameters of a microscope to generate a plurality of focus-stacked images corresponding to the plurality of sets of images, wherein the one or more calibration parameters of the microscope comprise: one or more of a focal length of an objective lens of the microscope, an angular aperture of the objective lens, and a function of a stage position of the microscope;
        align the plurality of focus-stacked images in a horizontal plane; and
        upon aligning, perform position correction on the plurality of focus-stacked images to generate a composite image by identifying an overlapped region between the pair of adjacent focus-stacked images upon aligning the plurality of focus-stacked images using a horizontal coordinate transformation model, based on one or more calibration parameters.

8. The system of claim 7, wherein the images within a set of images from the plurality of sets of images are captured at a plurality of vertical positions of the image capturing device relative to an associated fixed section of the horizontal plane, and wherein the associated fixed section of the horizontal plane for each of the plurality of sets of images is unique.

9. The system of claim 7, wherein performing the position correction comprises:
receiving an initial X offset and an initial Y offset between a pair of adjacent focus-stacked images from the image capturing device, based on user input overlap percentage; and
refining the initial X offset and the initial Y offset.

10. The system of claim 7, wherein the image processing device is further configured to:
generate a plurality of surface depth maps corresponding to the plurality of sets of images, wherein generating a surface depth map is based on combining the images in the associated set of images.

11. The system of claim 7,
wherein performing the translation and scale correction comprises:
selecting an image from the images in the associated set of images as a reference image; and
performing affine transformation between the reference image and each of the images in the associated set of images, using the one or more calibration parameters of the microscope, to generate a set of translation and scale corrected images, and wherein the one or more calibration parameters of the microscope comprise one or more of a focal length of an objective lens of the microscope, an angular aperture of the objective lens, and a function of a stage position of the microscope.

12. The system of claim 7, wherein generating the composite image further comprises blending the overlapped region with non-overlapped region of the pair of adjacent focus-stacked images from the plurality of focus-stacked images, wherein the blending is one of an alpha blending and a pyramidal blending.

13. A non-transitory computer-readable medium storing computer-executable instructions for generating a composite image, the computer-executable instructions configured for:
receiving, via an image capturing device, a plurality of sets of images of at least a portion of a subject;
combining the images associated with each of the plurality of sets of images and performing translation and scale correction for the images applying vertical coordinate transformation model using the one or more calibration parameters of a microscope to generate a plurality of focus-stacked images corresponding to the plurality of sets of images, wherein the one or more calibration parameters of the microscope comprise: one or more of a focal length of an objective lens of the microscope, an angular aperture of the objective lens, and a function of a stage position of the microscope;
aligning the plurality of focus-stacked images in the horizontal plane; and
upon aligning, performing position correction on the plurality of focus-stacked images to generate a composite image representing the subject by identifying an overlapped region between the pair of adjacent focus-stacked images upon aligning the plurality of focus-stacked images using a horizontal coordinate transformation model, based on one or more calibration parameters.

14. The non-transitory computer-readable medium of claim 13, wherein the images within a set of images from the plurality of sets of images are captured at a plurality of vertical positions of the image capturing device relative to an associated fixed section of the horizontal plane, and wherein the associated fixed section of the horizontal plane for each of the plurality of sets of images is unique.

15. The non-transitory computer-readable medium of claim 13, wherein performing the position correction comprises:
receiving an initial X offset and an initial Y offset between a pair of adjacent focus-stacked images from the image capturing device, based on user input overlap percentage; and
refining the initial X offset and the initial Y offset.

16. The non-transitory computer-readable medium of claim 13, wherein the computer-executable instructions are further configured for:
generating a plurality of surface depth maps corresponding to the plurality of sets of images, wherein generating a surface depth map is based on combining the images in the associated set of images.

17. The non-transitory computer-readable medium of claim 13, wherein performing the translation and scale correction comprises:
selecting an image from the images in the associated set of images as a reference image; and
performing affine transformation between the reference image and each of the images in the associated set of images, using the one or more calibration parameters of the microscope, to generate a set of translation and scale corrected images.

18. The non-transitory computer-readable medium of 13, wherein generating the composite image further comprises blending the overlapped region with non-overlapped region of the pair of adjacent focus-stacked images from the plurality of focus-stacked images, wherein the blending is one of an alpha blending and a pyramidal blending.

* * * * *